United States Patent Office 3,347,946
Patented Oct. 17, 1967

---

3,347,946
DERIVATIVES OF HYDRINDACENE AND PROCESS FOR PREPARING SAME
Thomas F. Wood and John T. Angiolini, Wayne, N.J., assignors to Givaudan Corporation, New York, N.Y., a corporation of New Jersey
No Drawing. Filed Feb. 17, 1966, Ser. No. 528,086
13 Claims. (Cl. 260—668)

ABSTRACT OF THE DISCLOSURE

A process for preparing hydrindacenes is disclosed. The process involves reacting a material selected from the group consisting of isoprene and 2,3-dimethyl-1,3-butadiene with at least one bicyclic hydrocarbon having the formula:

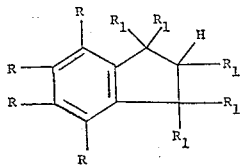

wherein R is a member selected from the group consisting of H and a lower alkyl group having up to five carbon atoms, provided that at least two adjacent R's are H except that where only one R is H it is adjacent to a labile tertiary alkyl group, $R_1$ is a member selected from the group consisting of H and $CH_3$, and R's may be the same or different, and the $R_1$'s may be the same or different, in the presence of an acid catalyst useful in bringing about Friedel-Crafts reactions, at a temperature within the range from about −30° to about 150°.

Seventeen detailed examples are given including those relating to the following reactions:

(a) isoprene and 1,1-dimethyl-6-isopropylindan are the reactants, and sulfuric acid is the catalyst;
(b) 5-isopropyl-1,1,3,3-tetramethylindan and isoprene are the reactants, and sulfuric acid is the catalyst;
(c) 1,1,4-trimethylindan, 1,1,6-trimethylindan and isoprene are the reactants, and sulfuric acid is the catalyst;
(d) 1,1,3,3-tetramethylindan and isoprene are the reactants, and sulfuric acid is the catalyst;
(e) 1,1-dimethylindan and isoprene are the reactants, and sulfuric acid is the catalyst;
(f) 1,1,4,7-tetramethylindan and isoprene are the reactants, and sulfuric acid is the catalyst;
(g) 1,1,2,4,7-pentamethylindan and 2,3-dimethyl-1,3-butadiene are the reactants, and sulfuric acid is the catalyst;
(h) 1,1,4-trimethyl-7-isopropylindan and isoprene are the reactants, and sulfuric acid is the catalyst; and
(i) 1,1,3,3,5-pentamethylindan and isoprene are the reactants, and sulfuric acid is the catalyst.

The novel compound, 5-isopropyl-3,3,8,8-tetramethyl-as-hydrindacene, is also disclosed.

---

The present application is a continuation-in-part application of copending application Ser. No. 223,240, filed September 12, 1962, and now abandoned, which was a continuation-in-part application of application Ser. No. 107,024, filed May 2, 1961, and now Patent No. 3,151,174.

The present invention relates to derivatives of hydrindacene and to a process for preparing the same.

A process for preparing hydrindacenes has been described in Schmerling U.S. Patent No. 2,848,512. That process involves the treatment of a conjugated diene with aromatic hydrocarbons containing at least two pairs of unsubstituted adjacent carbon atoms separated by at least one carbon atom, in the presence of a protonic acid catalyst.

It has been found, surprisingly, in accordance with this invention, that the aromatic hydrocarbons need not conform to the requirements laid down in the Schmerling patent when isoprene or 2,3-dimethyl-1,3-butadiene is employed as the diene. Indeed, using the hydrocarbons of the present process, one is able to make symmetrical and asymmetrical hydrindacenes, unlike the case with the Schmerling process, which results only in symmetrical hydrindacenes.

The process of this invention comprises reacting (a) a bicyclic hydrocarbon which may be represented by the following general formula:

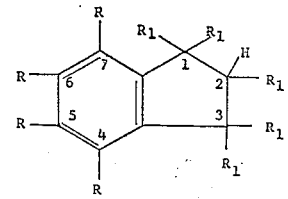

wherein at least two adjacent positions in the aromatic nucleus are unsubstituted, or if only one is unsubstituted it is adjacent to a labile tertiary alkyl group, the R's may be the same or different, the $R_1$'s may be the same or different, R=H or a lower alkyl group having up to five carbon atoms and $R_1$ is H or $CH_3$, with (b) isoprene or 2,3-dimethyl-1,3-butadiene in the presence of acid condensing catalysts. The products of this invention may be either sym.—or assym.—hydrindacenes formed in accordance with the following equations:

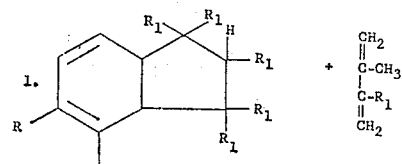

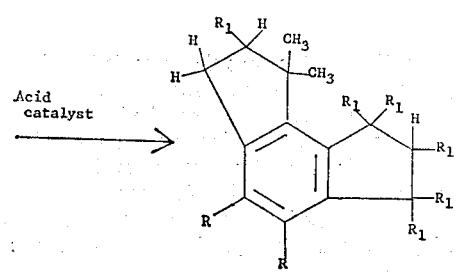

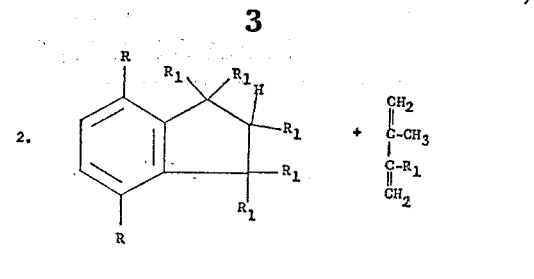

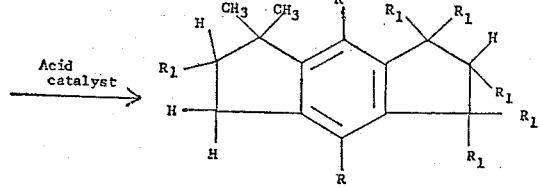

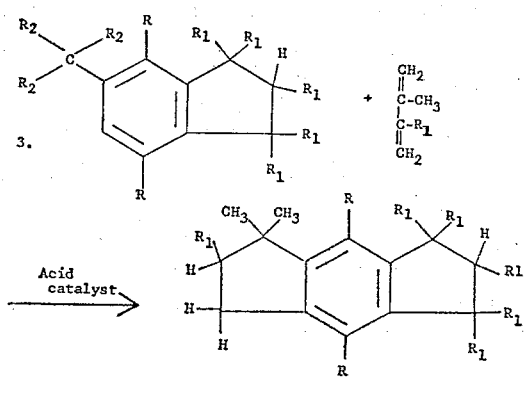

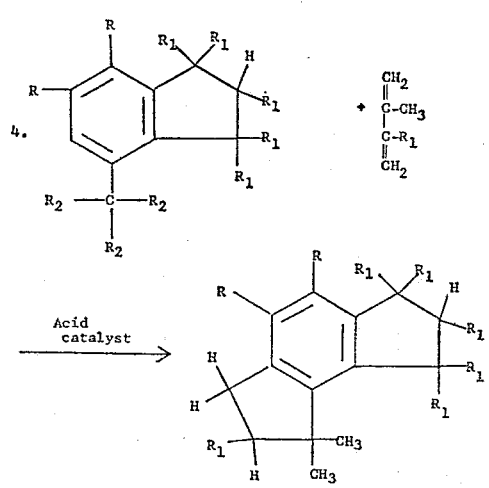

where the R's and R₁'s have the same designation as given previously and R₃ represents lower alkyl. Equations 3 and 4 above represent the cases where the indan does not have adjacent unsubstituted positions on the aromatic ring, but where the acidic catalyst causes removal of a labile tert-alkyl group with resulting hydrindacene formation.

The resulting hydrindacenes may be represented by the following formulae, arranged in pairs of isomers:

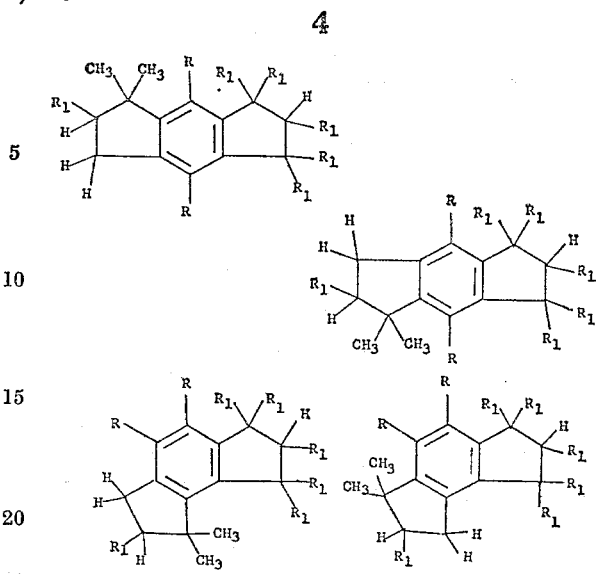

Reference in these specification and claims to any of the above-indicated compounds is intended to include a paired isomer, or a mixture of paired isomers, wherever the context so admits or requires. Thus, for example, 3,3,5,8,8, pentamethyl-as-hydrindacene and 3,3,5,6,6 pentamethyl-as-hydrindacene are paired isomers as shown by their structural formulae:

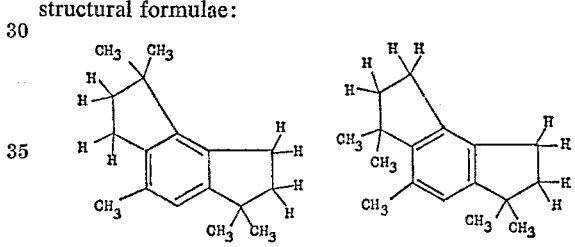

In general, the reaction is conveniently carried out by the slow addition of the isoprene or 2,3-dimethyl-1,3-butadiene, or a solution of one of these dienes in an inert solvent, or in the indicated bicyclic hydrocarbon, to a cold, rapidly stirred suspension (−10° to 10° C.) of the bicyclic hydrocarbon in sulfuric acid (93%). The reaction temperature is maintained at −10° to 10° C. during the addition which usually requires from 2 to 3 hours depending on the efficiency of the cooling. After addition is completed, the mixture is stirred a short time and quenched, or the acid separated. After being washed neutral the solution is vacuum-distilled to yield the desired product. An alternate mode of operation is to feed a solution of the "-diene" and all of the bicyclic hydrocarbon slowly into the cold sulfuric acid.

It is an advantage of this process that it may be operated at low temperature under atmospheric pressure. The preferred reaction temperature is considerably lower than the boiling point of isoprene and this reduces the hazard of fire and explosion. Furthermore, apparatus suitable for carrying out reactions under atmospheric pressure is considerably cheaper and simpler in construction and design than that required for pressure reactions.

While aqueous sulfuric acid of about 93% concentration gives advantageous results, sulfuric acid of other concentrations, as well as other condensing catalysts may be used in accordance with the present invention. Thus, sulfuric acid within the range from about 75% to about 96% strength has been found to give desirable results. The 93% strength sulfuric acid is preferred because it is commercially available, gives excellent yields with a minimum of by-products and has a low freezing point much below the temperature of the reaction.

Other acids which may be used as condensing catalysts herein are those acids which are capable of acting as Friedel-Crafts condensing catalysts. Examples of such acids are phosphoric acid, polyphosporic acid, boron trifluoride-water complex and hydrofluoric acid.

In carrying out the process of this invention the proportions of the ingredients may be varied over wide limits. It is preferred to use at least 1 mol and advantageously 2 to 10 mols of the bicyclic hydrocarbon per mol of diolefin in order to minimize side reactions, such as polymerization of the diolefin. The acid catalysts may be employed in amounts varying from about 5 to about 100%, by weight, based on the bicyclic hydrocarbon employed.

The temperature at which the process of this invention is carried out may also be varied over wide limits, i.e., from about −30° C. to about 150° C. When sulfuric acid is employed, the temperature may advantageously be from about −30° C. to about 80° C. In general, the higher the acid strength, the lower the temperature to be used. Thus, when sulfuric acid of about 75%–80% strength is used, a temperature above 30° C., preferably about 60° C. to 80° C. is desirable. When sulfuric acid of 85–90% strength is used, a temperature of about 5° C. to about 50° C. is suitable. With sulfuric acid of 90%–95% strength, a temperature from about −30° C., to about 15° C., preferably from about −10° C. to 10° C., is desirable.

When milder condensing acids, such as phosphoric and polyphosphoric acids, are used, higher reaction temperatures, such as about 105° C. to 150° C., are suitable. Anhydrous HF is active at about the same temperatures as 93% sulfuric acid, namely, −30° to 50° C. The $BF_3 \cdot H_2O$ catalyst is quite active at 25° to 35° C.

The hydrindacenes formed by the process (and examples) of this invention are suitable for use as chemical intermediates, intermediates for odorants, including musk odorants, low cost aromatic solvents, diesel fuel additives, and as intermediates for the preparation of saturated tricyclic hexahydro hydrindacenes with the desirable characteristics required in jet fuels. These saturated hexahydro hydrindacenes may be prepared by hydrogenating the hydrindacenes formed by the present process at elevated temperatures, e.g., 200° C. or higher, in the presence of Raney nickel as catalyst.

The invention is further illustrated by the following examples without however, limiting it to them. The temperatures given in the specification are in degrees centigrade, unless otherwise stated.

EXAMPLE I

*5-isopropyl-3,3,8,8-tetramethyl-as-hydrinacene*

Into a rapidly stirred mixture of 1,200 g. of 93% sulfuric acid and 1,356 g. of monochlorobenzene, chilled to −5°, there was fed dropwise over a 4 hr. period a solution of 306 g. isoprene (4.5 moles) in 555 g. of 1,1-dimethyl-6-isopropylindan (2.95 moles) keeping the temperature at −5 to 0° throughout. Stirring was continued for 40 minutes longer after the feed. After settling the lower sulfuric acid layer was removed (1,625 g.). The oil layer was washed successively with water (300 ml.), 5% sodium hydroxide solution (300 ml.), and 5% sodium bicarbonate solution (300 ml.). There was added 1,000 ml. of toluene during the washing to aid in separations and overcome the emulsions which formed. The solution was filtered and distilled to remove the toluene and monochlorobenzene solvent. The residual oil was vacuum-distilled to yield unconverted 1,1-dimethyl-6-isopropylindan, B.P. 72–73° (1 mm.), $n_D^{20}$ 1.5065 (198 g. recovered), and 33 g. of an intermediate fraction, B.P. 73–113° (1 mm.). Finally there was obtained the desired derivative as a colorless fraction, B.P. 113–122° (1 mm.), which rapidly crystallized (268 g.) along with 19 g. of residues. The solid product recrystallized three times from 1.5 times its weight of ethyl alcohol amounted to 128 g., M.P. 86–87°. This hydrocarbon was a snow-white odorless product which upon hydrogenation, as aforesaid, yields a jet fuel.

*Analysis.*—Calcd. for $C_{19}H_{28}$: C, 89.06; H, 10.94. Found: C, 89.08; H, 11.06.

*5-acetyl-3,3,8,8-tetramethyl-as-hydrindacene*

An acetyl derivative was prepared by feeding a solution of 64 g. of the aforementioned 5-isopropyl-3,3,8,8-tetramethyl-as-hydrindacene and 30 g. of acetic anhydride in 64 g. ethylene dichloride into a cold (0°) mixture of 73 g. of $AlCl_3$ and 100 g. of ethylene dichloride over a period of 2 hours while the temperature was allowed to rise to 10° C. After the addition, the batch was stirred for 4 hours at room temperature and then quenched on cracked ice (500 g.). The resulting ethylene dichloride solution was washed successively with water 2 x 200 ml.) and 5% sodium carbonate soltuion (200 ml.). After evaporation of the ethylene dichloride the acetyl derivative was obtained as a colorless solid (67 g.). After being twice crystallized from ethyl alcohol and once crystallized from isopropyl alcohol the derivative (15 g.) melted at 95–96° and had a persistent musk-like odor. It is suitable as a fixative in perfumery. Analysis indicates that the isopropyl group was replaced during the acetylation.

*Analysis.*—Calcd. for $C_{18}H_{24}O$: C, 84.32; H, 9.44. Found: C, 83.97; H, 9.41.

When the acetylation was conducted at 0° throughout, using acetyl chloride rather than acetic anhydride, the principal acetyl derivative, which was isolated, melted at 139–140° and was devoid of musk odor. Analysis indicated retention of the isopropyl group. The product, in this case, was therefore 4-acetyl-5-isopropyl-3,3,8,8-tetramethyl-as-hydrindacene.

*Analysis.*—Calcd. for $C_{21}H_{30}O$: C, 84.51; H, 10.13. Found: C, 84.38; H, 9.96.

EXAMPLE II

*1,1,3,3,8,8-hexamethyl-5-isopropyl-as-hydrindacene*

Into a rapidly stirred mixture of 230 g. of 93% sulfuric acid 340 g. of monochlorobenzene, chilled to −5°, there was fed in dropwise over a 2 hr. period, a solution of 68 g. isoprene (1 mole) in 216 g. 5-isopropyl-1,1,3,3-tetramethylindan (made from isobutylene and α-methyl-p-isopropylstyrene by the procedure of U.S. Patent 2,851,501) keeping the temperature of −5° to 0° throughout Stirring was continued for 40 minutes longer after the feed. After settling, the lower sulfuric acid layer (260 g.) was removed. The oil layer was washed successively with water (100 ml.), 5% sodium hydroxide solution (100 ml.) and 5% sodium bicarbonate solution (100 ml.). There was added 250 ml. of toluene during the washing to aid in separations and overcome the emulsions which formed. The solution was filtered and distilled to remove the toluene and monochlorobenzene solvent. The residual oil was vacuum-distilled to yield unconverted 5-isopropyl-1,1,3,3-tetramethylindan, B.P. 77° (1.5 mm.), $n_D^{20}$ 1.4999 (120 g. recovered). The still residue (116 g.) crystallized on standing overnight. After three successive crystallizations of this solid from isopropyl alcohol there was obtained 48 g. of colorless product, M.P. 94–95°.

*Analysis.*—Calcd. for $C_{21}H_{32}$: C, 88.66; H, 11.34. Found: C, 88.68; H, 11.11.

Hydrogenation of the product of this example yields a saturated hydrocarbon which can be used as fuel in a jet engine.

Acetylation of the product of this example yielded a colorless, odorless derivative, M.P. 149–149.5°.

EXAMPLE III

*3,3,5,8,8-pentamethyl-as-hydrindacene (and isomer)*

Into a rapidly stirred suspension of 425 g. of 1,1,6-trimethylindan and 77 g. of 93% sulfuric acid, cooled to −2°, was slowly added dropwise a solution of 136 g. of isoprene (2 moles) and 325 g. 1,1,6-trimethylindan over a 3 hour period, while the reaction temperatuer was kept at −3° to 2°. After the addition was completed, stirring was continued for 40 minutes longer and then the batch was quenched into 500 g. of water and allowed to settle. Separation was good. The lower aqueous layer was discarded and the remaining oil layer washed thoroughly with 500 g. of warm 25% sodium carbonate solution. Distillation gave recovered 1,1,6-trimethylindan (516 g.), B.P. 57–60° (2 mm.) and 309 g. of a mixture, B.P. 108–109° (2 mm.), containing 74% of 3,3,5,8,8-pentamethyl-as-hydrindacene and 24% of its paired isomer, 3,3,5,6,6-pentamethyl-as-hydrindacene. The distillate solidified on standing.

Acetylation of the above hydrocarbon mixture yielded a solid derivative which after crystallization from ethanol melted at 123–124°.

*Analysis.*—Calcd. for $C_{19}H_{26}O$: C, 84.39; H, 9.69. Found: C, 84.46; H, 9.37.

EXAMPLE IV

*1,1,3,3,5,5-hexamethyl-s-hydrindacene*

Into a rapidly stirred mixture of 239 g. of 93% sulfuric acid, cooled to −5°, and 340 g. of monochlorobenzene (3 moles) was added dropwise a solution of 68 g. isoprene (1 mole) in 174 g. 1,1,3,3-tetramethylindan (1 mole) (made by procedure of U.S. Patent 2,851,501, using α-methylstyrene and isobutylene) over a 3 hr. period while the temperature was maintained at −5 to 0°. Stirring was continued 40 minutes at 0°. The batch was settled, separated, washed and worked up in the usual manner, e.g., in accordance with the procedure of Example II. Distillation yielded the desired product as a fraction, B.P. 96–99° (1 mm.), amounting to 75 g., which rapidly solidified. Crystallization from ethanol yielded 50 g. of colorless solid, M.P. 55–56°. The infrared spectrum showed the absorption bands at 7.57 and 7.69μ characteristic of indan derivatives. The compound has the structure:

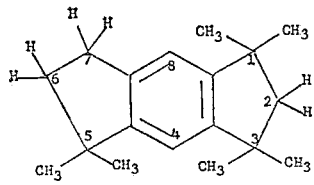

*Analysis.*—Calcd. for $C_{18}H_{26}$: C, 89.19; H, 10.81. Found: C, 89.63; H, 11.08.

Hydrogenation of the above hydrocarbon yields a product which can be used as a jet fuel.

EXAMPLE V

*1,1,7,7-tetramethyl-s-hydrindacene (and isomer)*

Into a rapidly stirred mixture of 230 g. of 1,1-dimethylindan and 50 g. of 93% sulfuric acid at −5°, there was fed in dropwise a solution of 82 g. of isoprene in 180 g. of 1,1-dimethylindan over a 2½ hour period while the reaction temperature was maintained at −5 to 0°. The reaction mixture was stirred at 0° for 40 min. after the feed and then allowed to settle. The sulfuric acid separated cleanly and formed a lower layer (62 g.). This was withdrawn and discarded. The remaining oil layer was washed first with 20% caustic soda solution and finally with 5% bicarbonate of soda solution (200 ml. each). The product was then vacuum-distilled at 2 mm. yielding 265 g. recovered 1,1-dimethylindan, B.P. 38–40° (2 mm.), and 110 g. of desired product, B.P. 135–138° (2 mm.), which rapidly solidified on standing. The yield was 162% by wt. based on isoprene. This product is a mixture of 1,1,7,7-tetramethyl-s-hydrindacene and 1,1,5,5-tetramethyl-s-hydrindacene in the proportion of 3.5/1 as shown by vapor-phase chromatography.

Crystallization of the above distillate three times from ethanol using an equal weight of solvent each time gave a pure isomer, M.P. 92–94°. This product is 1,1,7,7-tetramethyl-s-hydrindacene.

*Analysis.*—Calcd. for $C_{16}H_{22}$: C, 89.65; H, 10.35. Found: C, 89.55; H, 10.24.

The 1,1,7,7-tetramethyl-s-hydrindacene on acetylation gave a colorless, odorless, solid acetyl derivative, M.P. 59–61°.

EXAMPLE VI

*1,1,4,7,7-pentamethyl-s-hydrindacene*

Into a rapidly stirred mixture of 77 g. of 93% sulfuric acid and 535 g. of 7-isopropyl-1,1,4-trimethylindan at −3° was fed a solution of 136 g. of isoprene and 415 g. of 7-isopropyl-1,1,4-trimethylindan over a two and one-half hr. period at a reaction temperature of −5 to 0°. After the addition was completed, the stirring was continued for 40 minutes longer. The cold reaction mixture was then quenched on 200 g. ice-water with agitation. The resulting mixture was then allowed to settle whereupon two layers formed. The lower aqueous layer was separated and discarded. The remaining oil layer was washed successively with water (200 ml.), 5% aqueous sodium hydroxide solution (200 ml.), and warm 25% sodium carbonate solution. The product was vacuum-distilled to give 649 g. recovered 7-isopropyl-1,1,4-trimethylindan, B.P. 92–100° (2 mm.) and 115 g. of 1,1,4,7,7-pentamethyl-s-hydrindacene, B.P. 108–115° (2 mm.) which rapidly solidified. This was purified by recrystallization from isopropyl alcohol and obtained as a colorless solid, M.P. 92–93°. Carbon and hydrogen analysis indicated that the isopropyl group, which was originally present in the 7-isopropyl-1,1,4-trimethylindan, had been lost during the reaction.

*Analysis.*—Calcd. for $C_{17}H_{24}$: C, 89.41; H, 10.59. Found: C, 89.50; H, 10.65.

A higher boiling fraction, B.P. 147–150° (2 mm.), amounting to 45 g., was obtained which rapidly solidified. This was crystallized from petroleum ether and obtained as a colorless solid, M.P. 160–161°. Analysis showed that this was 8-isopropyl-1,1,4,7,7-pentamethyl-s-hydrindacene.

*Analysis.*—Calcd. for $C_{20}H_{30}$: C, 88.82; H, 11.18. Found: C, 88.85; H, 11.38.

EXAMPLE VII

*1,1,4,7,7,8-hexamethyl-s-hydrindacene and isomer*

Into a rapidly stirred mixture of 100 g. of 93% sulfuric acid and 650 g. of 1,1,4,7-tetramethylindan at −5° was fed a solution of 220 g. of isoprene in 500 g. of 1,1,4,7-tetramethylindan, dropwise, over a 3 hour period while the temperature was maintained at −5 to −2°. After the addition was completed, stirring was continued 40 minutes longer at −5°. The reaction mixture was then quenched on 500 g. of ice-water and allowed to settle. The lower aqueous layer was withdrawn and discarded. The remaining oil layer was washed thoroughly with 20% sodium carbonate solution (1,000 g.) and distilled. After recovery of excess 1,1,4,7-tetramethylindan (B.P. 86–88° at 2 mm.), amounting to 650 g., there was obtained 586 g. of the desired hydrindacene mixture 1,1,4,7,7,8-hexamethyl-s-hydrindacene and 1,1,4,5,5,8-hexamethyl-s-hydrindacene (ratio=1.7/1.), B.P. 135° (2 mm.), which rapidly solidified after distillation. This product was crystallized from 10 times its weight of ethanol giving a 76% yield of product which partly melted at 79–80° and then completely melted at 121–122°. Vapor-phase chromatography indicated an approximately equimolar mixture of the two isomers. The hydrocarbon mixture analyzed as follows:

*Analysis.*—Calcd. for $C_{18}H_{26}$: C, 89.19; H, 10.81. Found: C, 89.15; H, 10.80.

The above described hydrocarbon mixture can be hydrogenated to give a suitable fuel for jet engines.

EXAMPLE VIII

*1,1,3,3,5,8,8-heptamethyl-as-hydrindacene*

Into a rapidly stirred mixture of 25 g. of 93% sulfuric acid and 50 g. of 1,1,3,3,5-pentamethylindan (I) (made by the procedure of U.S. Patent 2,851,501 from α,p-dimethylstyrene and isobutylene) was added a solution of 16 g. isoprene and 20 g. of the 1,1,3,3,5-pentamethylindan over a 3 hour period while the mixture was kept at −5 to 0°. Stirring was continued for 40 minutes at −5° after the addition was complete. There was added 100 ml. benzene with stirring. The mixture was allowed to settle. The lower sulfuric acid layer was separated and discarded. The remaining benzene solution was washed successively with water (100 ml.), 5% aqueous sodium hydroxide solution (100 ml.) and 5% aqueous sodium bicarbonate solution (100 ml.). The washed benzene solution was filtered and distilled. After removal of the benzene, mainly at atmospheric pressure, the unreacted I, amounting to 35 g., was obtained as a fraction, B.P. 59–62° (1.2 mm.). The remaining residue (35 g.) M.P. 105–111° was recrystallized from isopropyl alcohol 3 times. The purified hydrocarbon melted at 115–116°. The infrared spectrum showed a penta-substituted benzene derivative. The compound was vacuum-dried and analyzed for carbon and hydrogen.

*Analysis.*—Calcd. for $C_{19}H_{28}$: C, 88.99; H, 11.01. Found: C, 89.13; H, 10.95.

EXAMPLE IX

1,1,4,6,7,7,8-heptamethyl-s-hydrindacene and isomer

Into a rapidly stirred mixture of 60 g. of 93% sulfuric acid and 360 g. of 1,1,4,7-tetramethylindan at −5° was fed a solution of 100 g. of 2,3-dimethyl-1,3-butadiene in 280 g. of 1,1,4,7-tetramethylindan, dropwise, over a 3 hour period while the temperature was maintained at −5 to −2°. After the addition was completed, stirring was continued 40 min. longer at −5°. The reaction mixture was then quenched on 150 g. of ice-water and allowed to settle. The lower aqueous layer was withdrawn and discarded. The remaining oil layer was washed successively with 200 g. of 20% sodium acetate solution (good separation after 2 hours) and 200 g. of 10% soda ash solution and then vacuum-distilled. After recovery of excess 1,1,4,7-tetramethylindan (B.P. 86–88° at 2 mm.) amounting to 463 g., there was obtained 167 g. of the desired product, B.P. 145–150° (2 mm.). This material was a viscous colorless liquid. The product is a mixture of the "paired" isomers, 1,1,4,6,7,7,8-heptamethyl-s-hydrindacene and 1,1,4,5,5,6,8-heptamethyl-s-hydrindacene.

*Analysis.*—Calcd. for $C_{19}H_{28}$: C, 88.99; H, 11.01. Found: C, 89.14; H, 10.85.

Hydrogenation of the above mixture produces a fuel satisfactory for jet engines.

EXAMPLE X

5-isopropyl-3,3,7,8,8-pentamethyl-as-hydrindacene

Into a rapidly stirred mixture of 300 g. of 1,1-dimethyl-6-isopropylindan, I, and 50 g. of 93% sulfuric acid at −5° was fed a solution of 100 g. of 2,3-dimethyl-1,3-butadiene in 230 g. of I, dropwise, over a 2½ hour period while the temperature was maintained at −5 to −3°. After the addition was completed, stirring was continued 40 min. longer at −4°. The reaction mixture was then quenched on 100 g. of ice-water. There was added 300 ml. benzene and the mixture shaken and allowed to settle. The lower aqueous layer was withdrawn and discarded. The remaining oil layer was washed with 300 g. of warm 20% soda ash solution and then vacuum-distilled. After recovery of unreacted I, 328 g., there was obtained 309 g. of the desired 5-isopropyl-3,3,7,8,8-pentamethyl-as-hydrindacene, B.P. 126–129° (2 mm.) which contained a small amount of its "paired" isomer, 5-isopropyl-3,3,6,6,7-pentamethyl-as-hydrindacene. The product was a colorless viscous liquid.

*Analysis.*—Calcd. for $C_{20}H_{30}$: C, 88.82; H, 11.18. Found: C, 89.33; H, 10.82.

This hydrocarbon product can be catalytically hydrogenated to produce a fuel suitable for use in a jet engine.

EXAMPLE XI

1,1,4,6,7,7-hexamethyl-s-hydrindacene

With the same general procedure as given in the preceding Example X, 100 g. of 2,3-dimethyl-1,3-butadiene was reacted with 630 g. of 7-isopropyl-1,1,4-trimethylindan in the presence of 50 g. of 93% sulfuric acid to produce 108 g. of 1,1,4,6,7,7-hexamethyl-s-hydrindacene, a colorless, viscous liquid, B.P. 115° (2 mm.) which formed with elimination of the isopropyl group.

*Analysis.*—Calcd. for $C_{18}H_{26}$: C, 89.19; H, 10.81. Found: C, 89.10; H, 11.06.

This product when hydrogenated gives a fuel suitable for use in jet engines.

A useful by-product was obtained as a higher boiling fraction, B.P. 145–147° (2 mm.), which amounted to 41 g. This product crystallized on standing. Analysis indicates that this product is 1,1,4,6,7,7-hexamethyl-8-isopropyl-s-hydrindacene.

*Analysis.*—Calcd. for $C_{21}H_{32}$: C, 88.66; H, 11.34. Found: C, 88.59; H, 11.62.

This can also be useful as an intermediate for preparing jet fuels.

EXAMPLE XII

1,1,6,7,7-pentamethyl-s-hydrindacene and isomer

Into a rapidly stirred mixture of 50 g. of 93% sulfuric acid and 100 g. of 1,1-dimethylindan, I, chilled to −5°, there was fed dropwise over a 2 hour period a solution of 50 g. of 2,3-dimethyl-1,3-butadiene in 110 g. of I, while the reaction temperature was maintained at −3 to −5° throughout. Stirring was continued for 40 min. longer after the feed. The batch was then quenched on 100 ml. of ice-water and allowed to settle. The lower sulfuric acid layer was then removed. The remaining oil was washed with 100 g. of warm 20% sodium carbonate solution. The crude was vacuum-distilled to yield unconverted I, 142 g., B.P. 45° (2 mm.), and 81 g. of the desired 1,1,6,7,7-pentamethyl-s-hydrindacene, a colorless viscous liquid, B.P. 110–115° (2 mm.), which slowly solidified on standing. The product contained 30% of the "paired" isomer of the main product as shown by VPC analysis.

*Analysis.*—Calcd. for $C_{17}H_{24}$: C, 89.41; H, 10.59. Found: C, 89.40; H, 10.50.

This compound on hydrogenation gives a hydrocarbon mixture suitable for use as a fuel for jet engines.

EXAMPLE XIII

1,1,2,4,6,6-hexamethyl-as-hydrindacene and isomer

Into a rapidly-stirred mixture of 50 g. of 93% sulfuric acid and 250 g. of 1,1,6-trimethylindan, I, chilled to −5°, there were fed dropwise over 2½ our period a solution of 100 g. of 2,3-dimethyl-1,3-butadiene in 255 g. of I, while the reaction temperature was maintained at −3 to −4° throughout. Stirring was continued for 1 hour longer after the completion of the feed. The batch was then quenched with stirring on 100 g. ice-water and then allowed to settle. After removal of the lower sulfuric acid layer (good separation), the remaining oil layer was washed with 10% soda ash solution and vacuum-distilled. There was recovered 302 g. of I, B.P. 51–53° (2 mm.) and then 230 g. of 1,1,2,4,6,6-hexamethyl-as-hydrindacene mixed with about 30% of its "paired" isomer. This mixture was obtained as a colorless, viscous liquid, B.P. 113–115° (1 mm.). The yield was 78% of theory.

*Analysis.*—Calcd. for $C_{18}H_{26}$: C, 89.19; H, 10.81. Found: C, 88.99; H, 10.59.

This compound on hydrogenation gives a hydrocarbon mixture suitable for use as a fuel for jet engines.

EXAMPLE XIV

1,1-dimethyl-s-hydrindacene and isomers

Into a rapidly stirred mixture of 342 g. of 93% sulfuric acid and 236 g. of indan, chilled to −3°, was added dropwise over a 2 hour period a solution of 136 g. of isoprene in 236 g. of indan with vigorous agitation while the temperature was maintained at −2 to −3°. The reaction was stirred for 40 minutes after the addition and then quenched with stirring on 300 g. of ice-water. After settling, the lower sulfuric acid solution was removed and discarded. The remaining oil layer was washed with 10% sodium carbonate solution and vacuum-distilled. After recovery of excess indan (272 g.), B.P. 74–75° (23 mm.) there was obtained the desired product, a colorless liquid, B.P. 97° (2 mm.), $n_D^{20}$ 1.5360, amounting to 74 g. Two minor impurities in the product were 1,1-dimethyl-as-hydrindacene, and 3-3-dimethyl-as-hydrindacene. Hydrogenation of the product gives a fuel suitable for use in jet engines.

EXAMPLE XV

1,1,2,4,6,7,7,8-octamethyl-s-hydrindacene and 1,1,2,4,5,5,6,8-octamethyl-s-hydrindacene By the general procedure disclosed in the preceding examples 41 g. of 2,3-dimethyl-1,3-butadiene was reacted with excess 1,1,2,4,7-pentamethylindan (232 g.) in the presence of 77 g. of 93% sulfuric acid. There was obtained 80 g. of product, B.P. 140–142° (2 mm.), (59% of theory), which rapidly solidified on standing. Vapor-phase chromatography shows the presence of two isomers in this product.

*Analysis.*—Calcd. for $C_{20}H_{30}$: C, 88.82; H, 11.18. Found: C, 88.5; H, 11.18.

EXAMPLE XVI

1,1,2-trimethyl-s-hydrindacene

By the general procedure disclosed in the preceding examples 2 g. of 2,3-dimethyl-1,3-butadiene was reacted in the cold (−5° to −3°) with excess indan (free of peroxides) in the presence of 40 g. of 93% sulfuric acid. There was obtained 114 g. of product, B.P. 104–105° (2 mm.), $n_D^{20}$ 1.5344. Analysis by vapor-phase chromatography showed the presence of 90% of the desired 1,1,2-trimethyl-s-hydrindacene.

*Analysis.*—Calcd. for $C_{15}H_{20}$: C, 89.94; H, 10.06. Found: C, 90.00; H, 10.45.

EXAMPLE XVII

1,1,4,7,7-pentamethyl-s-hydrindacene (alternate procedure)

By the general procedure disclosed in the preceding examples 100 g. of isoprene was reacted in the cold (−5°) with excess of 6-t-butyl-1,1,4-trimethylindan in the presence of 50 g. of 93% sulfuric acid catalyst. There was obtained, after vacuum distillation of the crude product, 60 g. of material, B.P. 100–113° (2 mm.), which rapidly solidified. Recrystallizaiton from isopropyl alcohol gave crystals melting at 92–93°. Comparison by vapor-phase chromatography and mixed melting point showed this product to be identical with that obtained in Example VI, above, from 7-isopropyl-1,1,4-trimethylindan. Thus, the t-butyl group originally present in 6-t-butyl-1,1,4-tri-methylindan was eliminated with formation of 1,1,4,7,7-pentamethyl-s-hydrindacene.

The foregoing illustrates the invention, which, however, is not to be limited thereby, but is to be construed as broadly as permissible in view of the prior art and limited solely by the appended claims.

We claim:
1. The process for preparing hydrindacenes, which comprises reacting a material selected from the group consisting of isoprene and 2,3-dimethyl-1,3-butadiene with at least one bicyclic hydrocarbon having the formula:

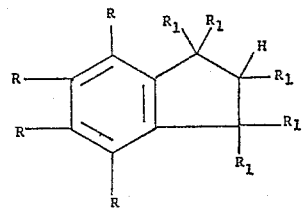

wherein R is a member selected from the group consisting of H and a lower alkyl group having up to five carbon atoms, provided that at least two adjacent R's are H except that where only one R is H it is adjacent to a labile tertiary alkyl group, $R_1$ is a member selected from the group consisting of H and $CH_3$, the R's may be the same or different, and the $R_1$'s may be the same or different, in the presence of an acid catalyst useful in bringing about Friedel-Crafts reactions, at a temperature within the range from about −30° to about 150°.

2. The process of claim 1, wherein isoprene is employed.

3. The process of claim 1, wherein 2,3-dimethyl-1,3-butadiene is employed.

4. The process of claim 1, wherein isoprene and 1,1-dimethyl-6-isopropylindan are the reactants, and sulfuric acid is the catalyst.

5. The process of claim 1, wherein 5-isopropyl-1,1,3,3-tetramethylindan and isoprene are the reactants, and sulfuric acid is the catalyst.

6. The process of claim 1, wherein 1,1,4-trimethyl, indan, 1,1,6-triemthylindan and isoprene are the reactants, and sulfuric acid is the catalyst.

7. The process of claim 1, wherein 1,1,3,3-tetramethylindan and isoprene are the reactants, and sulfuric acid is the catalyst.

8. The process of claim 1, wherein 1,1-dimethylindan and isoprene are the reactants, and sulfuric acid is the catalyst.

9. The process of claim 1, wherein 1,1,4,7-tetramethylindan and isoprene are the reactants, and sulfuric acid is the catalyst.

10. The process of claim 1, wherein 1,1,2,4,7-pentamethylindan and 2,3-dimethyl-1,3-butadiene are the reactants, and sulfuric acid is the catalyst.

11. The process of claim 1, wherein 1,1,4-trimethyl-7-isopropylindan and isoprene are the reactants, and sulfuric acid is the catalyst.

12. The process of claim 1, wherein 1,1,3,3,5-pentamethylindan and isoprene are the reactants, and sulfuric acid is the catalyst.

13. 5-isopropyl-3,3,8,8-tetramethyl-as-hydrindacene.

References Cited

UNITED STATES PATENTS 2,848,512    8/1958    Schmerling _____ 260—668
3,244,751    4/1966    Theimer et al. _____ 260—668 X DELBERT E. GANTZ, *Primary Examiner.*

C. R. DAVIS, *Assistant Examiner.*